(12) United States Patent
Wesby et al.

(10) Patent No.: US 6,847,826 B1
(45) Date of Patent: Jan. 25, 2005

(54) METHOD OF SYNCHRONIZATION OF A BASE STATION NETWORK

(75) Inventors: Philip Wesby, Espoo (FI); Alexander Esser, Espoo (FI)

(73) Assignee: Nokia Corporation, Espoo (FI)

( * ) Notice: Subject to any disclaimer, the term of this patent is extended or adjusted under 35 U.S.C. 154(b) by 455 days.

(21) Appl. No.: 09/708,103

(22) Filed: Nov. 3, 2000

Related U.S. Application Data

(63) Continuation of application No. PCT/EP99/02995, filed on May 3, 1999.

(30) Foreign Application Priority Data

| May 4, 1998 | (FI) | 980979 |
| Oct. 20, 1998 | (GB) | 9822965 |

(51) Int. Cl.[7] .................................................. H04Q 7/20
(52) U.S. Cl. ........................................ 455/502; 455/561
(58) Field of Search ................................. 455/502, 561, 455/517, 507, 436; 370/321, 324, 328, 330, 350, 331; 375/354, 356

(56) References Cited

U.S. PATENT DOCUMENTS

| 5,519,759 A |   | 5/1996 | Heineck et al. | |
| 5,537,434 A | * | 7/1996 | Persson et al. | 375/134 |
| 5,912,886 A | * | 6/1999 | Takahashi et al. | 370/350 |
| 6,014,376 A | * | 1/2000 | Abreu et al. | 370/350 |
| 6,112,100 A | * | 8/2000 | Ossoinig et al. | 455/502 |
| 6,480,483 B2 | * | 11/2002 | Yahata et al. | 370/350 |

OTHER PUBLICATIONS

Justin C.–I. Chuang; "Autonomous Time Synchronization Among Radio Ports in Wireless Personal Communications", IEEE Transactions on vehicular Technology, vol. 43, No. 1, Feb. 1, 1994pp. 27–32.

Yoshihiko Akaiwa et al.; "Autonomous Decentralized Inter–Base–Station Synchronization", IEEE 41$^{st}$ Vehicular Technology Conference, Conference 41, May 19, 1991, pp. 257–262.

S. Ariyavisitakul et al' "Network Synchronisation of Radio Ports in Wireless Personal Communications", Electronics Letters, vol. 28, No. 25, Dec. 3, 1992, pp. 2312–2314.

International Search Report for PCT/EP99/02995.

* cited by examiner

*Primary Examiner*—Erika A. Gary
(74) *Attorney, Agent, or Firm*—Squire, Sanders & Dempsey L.L.P.

(57) ABSTRACT

A telecommunications system has a first transmitter unit for transmitting first signals to at least one station; a second transmitter unit for transmitting second signals to at least one station; a receiving unit associated with the first transmitter unit for receiving the second signals; and a synchronization unit coupled to the receiving unit for generating a control signal to at least one of the first and second transmitters to increase the synchronization of the first and second signals.

36 Claims, 4 Drawing Sheets

METHOD OF SYNCHRONIZATION OF A BASE STATION NETWORK

This application is a continuation of PCT/EP99/02995, filed May 3, 1999.

This invention relates to synchronising a network and a method for synchronising a network, to at least some level of accuracy. The network could be a wireless telecommunications network such as a cellular communications network.

FIG. 1 shows schematically the configuration of a typical wireless cellular telecommunications network. The network comprises a number of base-stations (BSs) 1, 2, 3 etc. Each base-station has a radio transceiver capable of transmitting radio signals to and receiving radio signals from the area of an associated cell 4, 5, 6. By means of these signals the base-station can communicate with a terminal 9 which may be a mobile station (MS) in the associated cell. That terminal itself includes a radio transceiver. Each base station is connected via a base station controller (BSC) 7 to a mobile switching centre (MSC) 8, which is linked in turn to the public telephone network (PSTN) 10. By means of this system a user of the mobile station 9 can establish a telephone call to the public network 10 via the base station in whose cell the mobile station is located. The location of the terminal 9 could be fixed (for example if it is providing radio communications for a fixed building) or the terminal could be moveable (for example if it is a hand portable transceiver or "mobile phone"). When a mobile station moves from one cell to another it generally switches from communicating with the base station of the first cell to communicating with the base station of the second cell. That process is known as handover or handoff.

It has been appreciated by the inventors that if the transmissions of the base stations are accurately synchronised then a number of significant advantages could arise in the operation of the system. For example:

There may be no need for a mobile station to spend time and consume power in synchronising to a new base-station during handover. Thus handovers could be faster and more efficient.

There may be less interference in the system if transmission bursts from one base-station could be arranged so that they did not coincide (or coincided only in a preferred way) with those from neighbouring base-stations. Thus radio performance and/or network capacity can be improved.

However known networks, especially TDMA (time division multiple access) networks such as those based on the GSM (Global System for Mobile Communications) standard, are not synchronised. This is because it has been difficult to arrange for networks to be synchronised accurately. One way to allow synchronisation would be to provide every base-station with a very accurate clock. However, this is expensive. Another route would be to provide each base station with a separate receiver that can receive a universal time signal. For example if the location of each base station is known accurately then universal time can be determined using GPS (Global Positioning System) signals. However, this also increases cost because of the need to provide each base-station with a GPS receiver and makes the performance of the system dependant on the GPS system because if the GPS system fails then accurate synchronisation is lost.

It is an aim of embodiments of the present invention to provide at least some synchronisation without having the disadvantages of the proposals discussed hereinbefore.

According to one aspect of the present invention there is provided a telecommunications system comprising: a first transmitter unit for transmitting first signals to at least one station; a second transmitter unit for transmitting second signals to at least one station; a receiving unit associated with the first transmitter unit for receiving the second signals; and a synchronisation unit coupled to the receiving unit for generating a control signal to at least one of the first and second transmitters to increase the synchronisation of the first and second signals.

Thus a system which allows synchronisation to be achieved relatively simply and cheaply may be provided.

Preferably, the receiving unit is arranged to determine the difference between the timing of the first transmitter unit and the second transmitter unit. Preferably, the synchronizing unit is arranged to adjust said difference in timing to take into account the relative positions of said transmitter units.

The receiving unit may be arranged to calculate an average difference between the timing of the first transmitter unit and the second transmitter unit.

Preferably, the receiving unit is arranged to transmit the difference to said synchronization unit.

The first and second transmitter units may be arranged to be synchronised to within 5 $\mu$s. However this will be system dependent.

The synchronisation unit may be arranged to synchronise said first and second transmitters to a reference clock. The reference clock may be supplied by said synchronisation unit, a clock signal of one of said first and second transmitter units or the average of clock signals of said first and second transmitter units.

The synchronisation unit may be arranged to generate said control signal if the timing of said first and second transmitters differ by at least a predetermined amount.

The second transmitter unit may also have a receiving unit associated therewith for receiving said first signals, said receiving unit also being coupled to said synchronisation unit. This receiver unit may be the same as that associated with the first transmitter unit.

The synchronisation unit may be arranged to average the difference in the timing of the first and second transmitter units provided by the receiving units associated with the first and second transmitter units respectively. This may be a weighted average where one timing is given more importance than another, or an average in which both timings are given equal weight.

Preferably, the system comprises a third transmitter unit and a further receiving unit associated therewith, wherein each of the three receiving units determines the difference of the timing signals between the transmitter unit with which the receiving unit is associated and each of the other two transmitter units.

Preferably, said synchronisation unit is arranged to determine the minimum time difference between two transmitter units based on a comparison of the timing difference observed by the receiver unit associated with one of the two transmitter units between said transmitter units and the sum of: the difference observed by the receiver unit associated with said one transmitter unit between said one transmitter unit and the third transmitter unit; and the difference observed by the receiver unit associated with the third transmitter unit between the third transmitter unit and the other of the two transmitter units. It is preferable that all of these timing differences be adjusted to take into account the relative positions of the respective transmitter units.

The or at least one of the receiving units may be incorporated in the transmitter unit with which the receiving unit is associated. Alternatively, the receiver unit may be a separate entity at the respective transmitter unit or removed therefrom.

Preferably, the first and second transmitter units use a time division multiple access method where time is divided into a plurality of slots and said first and second transmitter units transmit signals to different stations in different time slots, said synchronisation unit being arranged to synchronise substantially the beginning of time slots of the first and second transmitter units.

The frequency of the first and said second transmitter units may change between time slots. In other words frequency hopping may be used.

n time slots may be arranged in a frame and each frame may have an associated number. Frames having the same frame numbers of said first and second signals may be synchronised. Alternatively, the frames having the same frame numbers of said first and second signals may overlap in time but the beginning of said frames do not coincide.

A multiplicity of transmitter units may be provided, said multiplicity of transmitter units being divided into a plurality of groups, each group comprising a plurality of transmitter units which are substantially synchronised with the other of the transmitter units in said group and the plurality of groups are not synchronised with respect to each other.

Any suitable number of transmitter units may be provided in each group. For example, each group may comprises three or four transmitter units, each transmitter unit serving a single cell. Alternatively, each group comprises two transmitter units, each transmitter unit serving a plurality of cells.

The system is a wireless cellular telecommunications network or any other type of wireless system or wired system. The wireless cellular network may be in accordance with the GSM standard or any other suitable standard. At least one of said transmitter units may be a base transceiver station or a functionally equivalent unit. Preferably, the synchronisation unit is incorporated in a base station controller or a functionally equivalent unit.

According to a second aspect of the present invention there is provided a method for synchronising a telecommunications system comprising: transmitting first signals to at least one mobile station from a first transmitter unit; transmitting second signals to at least one mobile station from a second transmitter unit; receiving the second signals at said first transmitter unit; and comparing the timing of the first signals with the timing of the second signals as received by at the first transmitter unit and generating a control signal to at least one of the first and second transmitter units to increase the synchronisation of the first and second signals.

According to a third aspect of the present invention, there is provided a telecommunications system comprising: a first transmitter unit for transmitting first signals to at least one station when said at least one station is in a first area covered by said first transmitter unit; a second transmitter unit for transmitting second signals to at least one station when said at least one station is in a second area covered by said second transmitter unit; and a timing difference determining unit for determining the difference in timing of said first and second transmitter units and for providing information on said difference to at least one station, said information being used by said station when said station moves between said first and second areas.

For a better understanding of the present invention and as to how the same may be carried into effect, reference will now be made by way of example to the accompanying drawings, in which.

The examples of embodiments of the invention that are described hereinafter relate to implementations in wireless cellular telecommunications systems, such as the GSM system. However, it must be noted that the present invention can be implemented in other networks, for example networks that use fixed links such as cables instead of or in addition to radio communications, or networks of other basic types such as paging or satellite networks. Embodiments of the present invention may be used in conjunction with any other types of suitable access method.

In this description the term "synchronisation" is used to refer to full or partial timing alignment of transmissions. The alignment is conveniently between neighbouring base-stations, which could be: base-stations having neighbouring, overlapping or contiguous areas of coverage; base-stations in a certain area; base stations whose areas of coverage lie wholly or partially in a certain area; or base stations which are under common supervision or control (e.g. by a single base station controller or mobile switching centre). In other types of networks, especially those that do not have defined time slots, synchronisation could be fully or partially to a suitable non-time-slot level.

It should be noted that because of propagation delays, a typical network (or a part of it) can generally only be fully synchronised as regards received signals for a given location in the network. It may therefore be more appropriate to consider the synchronisation of signals as transmitted. However, if (for instance in a cellular network) the transmissions of base-stations at the base station sites are synchronous then propagation delay of the radio signals from the base-stations will cause the transmissions from different base-stations to become out of alignment. This is a function of the position of the mobile station and the different propagating paths to each different base-station.

Figure 1:
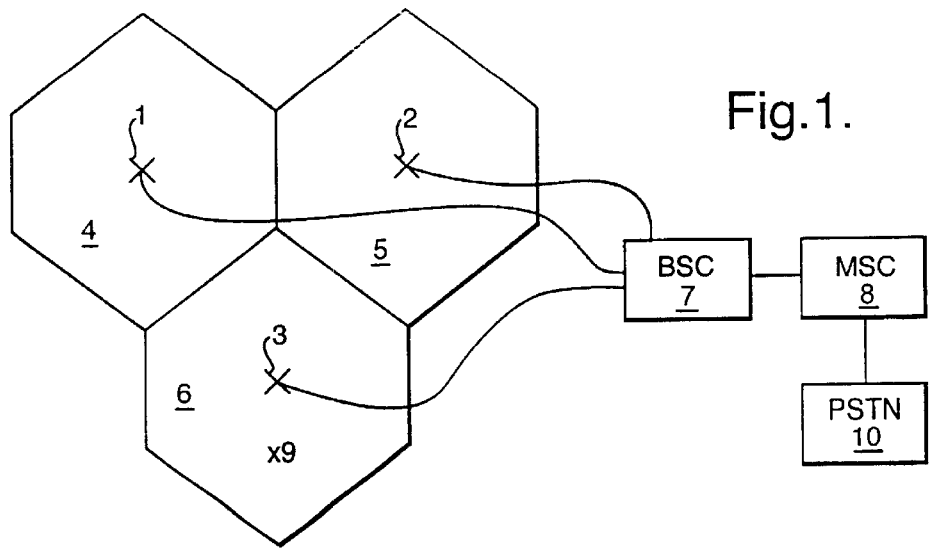
FIG. 1 shows schematically the configuration of a typical wireless cellular telecommunications network.
Figure 2:
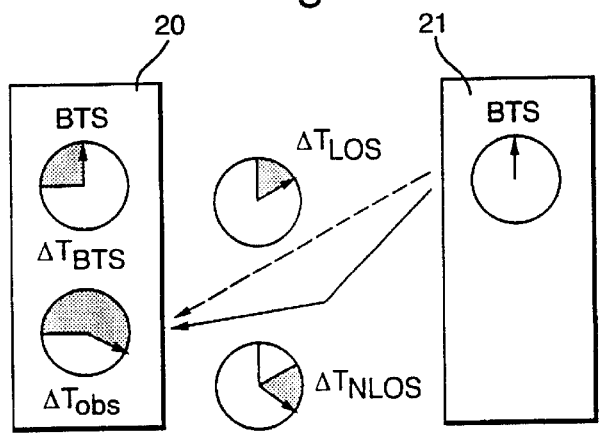
FIG. 2 illustrates timing differences between neighbouring base-stations.

The present exemplary embodiment of a synchronisation method is based on measuring the difference between the timing of one base-station (e.g. from the base-station's internal clock) and the timing of a nearby base-station as determined from reception of those transmissions. This is illustrated in FIG. 2. FIG. 2 illustrates exaggerated actual and observed relative clock phases as discussed below. FIG. 2 illustrates two base-stations 20, 21. Each base-station has a clock that is used for determining when the respective base-station should transmit its signals. Let $\Delta T_{BTS}$ be the actual relative phase between the two clocks (also known as Real Time Difference RTD). The specific cause of the non-alignment of the clocks (i.e. the origin of $\Delta T_{BTS}$) is not relevant to the present invention. It should however be noted that $\Delta T_{BTS}$ includes the variable phase delays occurring across the transmission equipment between a network reference clock and the respective base-station. Let $\Delta T_{obs}$ be the observed relative phase between a received signal from another base-station and the receiving base-station's clock (also known as Observed Time Difference OTD). $\Delta T_{obs}$ is larger than $\Delta T_{BTS}$ due to propagation delay between the base-stations.

If there is direct line of sight (LOS) then propagation delay $\Delta T_{LOS}$, is equal to the time for a transmitted signal to travel the direct geometric distance between the two base-stations also known as Geometric Time Difference GTD, (GTD=time to travel direct geometric distance). For non line of sight paths, there is an additional propagation delay, defined as $\Delta T_{NLOS}$ so that the total propagation delay is $\Delta TN_{LOS} + \Delta T_{LOS}$ for a non line of sight path. Thus we have the basic relationship:

$$\Delta T_{obs} = \Delta T_{BTS} + \Delta T_{LOS} + \Delta T_{NLOS}$$

This is illustrated in FIG. 2. Note that $\Delta T_{obs}$ and $\Delta T_{BTS}$ may be either positive or negative (because the distant clock can be either ahead or behind the receiving clock). In a typical TDMA system such as GSM, $\Delta T_{obs}$ and $AT_{BTS}$ can be considered to be within plus or minus half a burst period, since phases are only meaningful as partial measures within a single cycle. For example, a relative clock phase of any integral number of burst periods has no consequence. On the other hand, the propagation delays $\Delta T_{LOS}$ and $\Delta T_{NLOS}$ are always positive. Furthermore, the non-line of sight propagation delay $\Delta T_{NLOS}$ between any two base-stations may be non-symmetrical (different in both directions), for example if different antennas and output powers are used in the base-stations.

The objective of time slot alignment is to arrange for the phase misalignment $\Delta T_{BTS}$ to approach zero for two neighbouring base-stations, and preferably for a group of neighbouring base stations.

The accuracy to which synchronisation is required, i.e. how closely $\Delta T_{BTS}$ should approach zero, in order to provide benefits in a particular system depends on the design of the system itself. For example, in a GSM system a mobile station is synchronised to its serving base-station to a resolution of at least ¼ bit period (i.e. around 0.9 $\mu$s). However, benefits can be derived from network synchronisation to a much lower accuracy. According to the GSM specification, for the purpose of limiting the rate of up-ramping and down-ramping of power for each burst transmission, transmit power must be at least −6 dB relative to the nominal transmit power within the first and last 7 $\mu$s of each time slot. Furthermore, 5 $\mu$s is the meaningful time resolution derived from the GSM 200 kHz bandwidth. From an alternate perspective, the timing advance of the mobile station down-link transmissions is defined only to a resolution of 1 bit period (i.e. around 3.7 $\mu$s). If one considers micro cells and indoor systems, timing advance on this scale is of no consequence since 3.7 $\mu$s corresponds to about 1 km. These considerations suggest that a beneficial target accuracy for time slot alignment in a GSM system could be 5 $\mu$s or better.

Once a system is aligned to a time slot level, time slot numbering (frame numbers) may also be synchronised so that all synchronised base-stations simultaneously transmit bursts with the same frame number. This will be described in more detail hereinafter.

Figure 3:
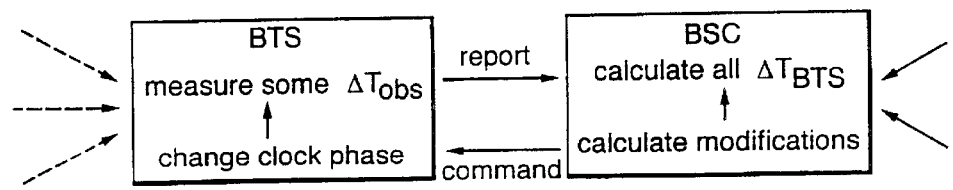
FIG. 3 illustrates a synchronisation method.

FIG. 3 illustrates a synchronisation method embodying the present invention. The method is based upon each base-station measuring the observed relative clock phases of its contiguous neighbour base-stations. This could be done using a receiver such as a conventional mobile station located at and linked to a respective base station or using a more dedicated receiver at each base-station. The dedicated receiver may be integrated into the base transceiver station. The base station controller processes these time offsets and with knowledge of geographic location of each base-station (or at least the ones from which it can receive signals) estimates the actual relative clock phases $\Delta T_{BTS}$ of those base stations. With this information from the base station controller, each base station can alter its own clock to reduce the error due to non-line of sight propagation delays. To achieve this the base-station delays its transmissions according to a clock phase correction calculated by the base station controller.

This method will now be described in more detail with respect to FIG. 7. In order to achieve full network synchronisation in this way it is necessary for each base-station either to be able to receive signals from at least one other base-station or to be capable of having its own signals received by at least one other base-station. If this is not possible then the operational area of the base station controller can be divided into several synchronised sub-areas.

The first stage is to pre-programme the base station controller with the base-stations' geographic locations. This pre-programming need only take place once. Distances between base-stations calculated from these locations should suitably be accurate to at least around 100 m; this corresponds to an accuracy of 0.33 $\mu$s for the line of sight propagation delay $\Delta T_{LOS}$. Currently, the operation and maintenance centre OMS of a GSM network does not need to store geographic locations with this accuracy. The base-stations' locations could be determined from network planning data or by other means.

It should be noted that, as will be described in more detail below, knowledge of geographic locations is not essential for base stations which can each receive signals from the other base stations, but it is preferable nevertheless.

The next stage is that each base station must have the capability to receive signals sent from other base stations to mobile stations—that is the capacity to receive in the downlink direction, e.g. on BCCH frequencies for a GSM network. The BCCH (broadcast control channel) is used by the base station to provide mobile stations with the base station identity and information pertaining to the cell. The hardware needed to achieve this may need to be added to the base stations. This measurement hardware will be referred to as a GEMU (Generic Measurement Unit). Some ways in which a GEMU can be provided at a base station are as follows:

1. A separate GEMU which is nearby its host base station but not physically connected to it. This wireless GEMU could use built-in mobile station functionality also to communicate with the network (and specifically its host base station) over a radio link. It could be based on a Wireless Local Loop (WLL) terminal.
2. A separate GEMU which is cable-connected to the host base station.
3. An internal expansion module for a base station.
4. A modified transmission unit for a base station.
5. A GEMU fully integrated with the base station.

Of these, an internal solution would probably be the most cost effective in the long run. The hardware changes required to modify a transmission unit are problematic because the signals received from other base stations do not fall in the transmission unit's own time slots. (Different frequency hopping sequences are not an issue in a GSM system since only BCCH carriers are of interest—in contrast to time of arrival TOA measurements for mobile station location). External options allow for rapid development, optimisation of line of sight conditions (since base station locations are usually not optimised for line of sight), and sufficient distance or shielding from the base station antenna to protect the GEMU from being overloaded by signals from its own base station. An external radio-linked GEMU (option 1) would be relatively compatible with existing base stations without many additional efforts.

The base stations must also have the capability to alter their timings for radio transmissions. In most cases this could be done with a software modification to existing base stations.

For simplicity in the following descriptions, it will be assumed that the GEMU is integral part of its base station or can be considered as such.

Figure 7:
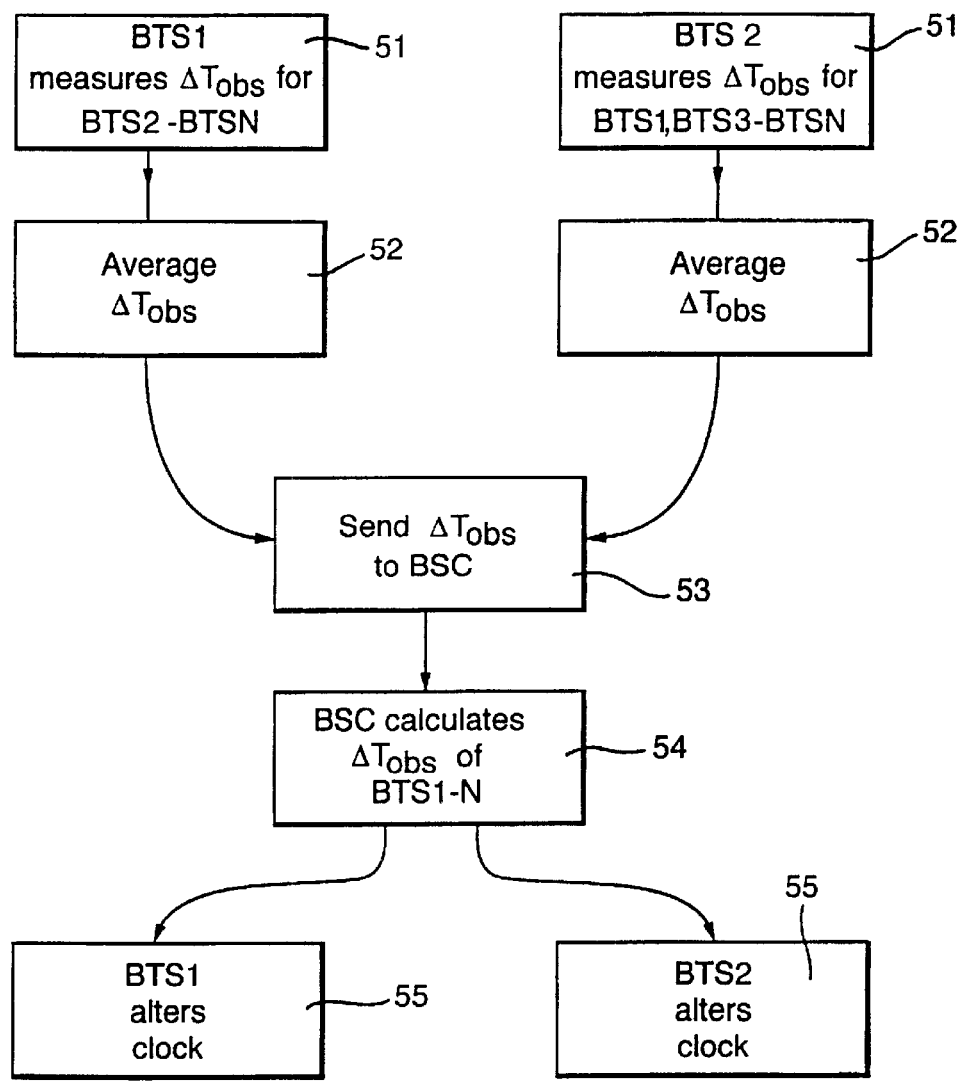
FIG. 7 illustrates in more detail the synchronisation method of FIG. 3.

In step S1 of FIG. 7, each base station BTS 1 and BTS 2 (two base stations being shown in FIG. 7 although the total number of base stations to be synchronised is N) measures the observed relative clock phases of the other of the N base stations. For the measurement of observed relative clock phases $\Delta T_{obs}$ each base station pre-synchronises to other base stations (in the same way as a mobile station does when pre-synchronising to adjacent base stations by analysing frequency correction and synchronisation bursts in GSM systems). The base station then measures the time offsets $\Delta T_{obs}$ of the received signals relative to its own clock. (A wireless GEMU could get the clock signal of its host base station by synchronising also to the host base station over the radio interface. Its distance from its base station may be up to about 100 m so in pico cell environments one GEMU might even serve more than one host.)

A time resolution of ¼ bit period ($\approx 0.9$ $\mu$s) for $\Delta T_{obs}$ and an accuracy of $10^{-7}$ should be achievable by any mobile station following GSM specifications. This would also be sufficient requirement for the base station; however, a higher resolution is achievable.

The base station controller defines which neighbouring base stations each base station should monitor. This may be changed from time to time. In the example shown in FIG. 7 each base station monitors the other N-1 members of the group. Received signals from the base stations can be identified by their BCCH frequency and BSIC (Base Station Identification Code). The simplest way for the base station controller to determine which base stations should be monitored by which others is to use the cell adjacency list; this could even be used by a base station itself to determine which neighbours to monitor. In a more sophisticated solution the base station controller could also select neighbours in a way that is particularly suited for achieving time slot alignment. If there are more neighbouring base stations than a base station is able to monitor continuously, then the base station controller might also change these neighbour definitions from time to time.

The base station averages in step S2 the observed time offsets $\Delta T_{obs}$ for the or each neighbouring base station over a time period such as a couple of minutes to obtain a stable observed time offset. The base stations then send in step S3 all these averaged time offsets $\Delta T_{obs}$ to the base station controller, preferably reporting with a resolution of at least 1 $\mu$s. This resolution is sufficiently higher than the target resolution and is of the order of the minimum resolution of the base station observed time offset measurements.

Observed clock phase measurements will be sent as often as required, suitably as determined by the phase instability of the base station clock, to maintain alignment of transmissions. This may be expected to be in the range from about 15 minutes to a couple of hours for typical clocks. As an option, the reporting of the clock phase measurements may be done under command from the base station controller.

To calculate actual relative clock phases $\Delta T_{BTS}$ the base station controller in step S4 builds a matrix M of all observed time offsets, corrected by the transmission delay $\Delta T_{LOS}$ due to line of sight geographical distance. The elements of this matrix can be written as:

$$M_{1 \leftarrow 2} = \Delta T_{obs} - \Delta T_{LOS}$$

(for the clock phase of base station 2 as observed by base station 1). $M_{1 \leftarrow 2}$ remains undefined if base station 1 did not provide a measurement for base station 2, either because it was not told to monitor base station 2 or because it does not "see" base station 2. The line of sight-corrected time offsets $M_{1 \leftarrow 2}$ differ from the actual clock phases $\Delta T_{BTS}$ by non-LOS propagation delays $\Delta T_{NLOS}$, since $M_{1 \leftarrow 2} = \Delta T_{BTS} + \Delta T_{NLOS}$, according to the basic equation:

$$\Delta T_{obs} = \Delta T_{BTS} + \Delta T_{LOS} + \Delta T_{NLOS}.$$

Figure 4:
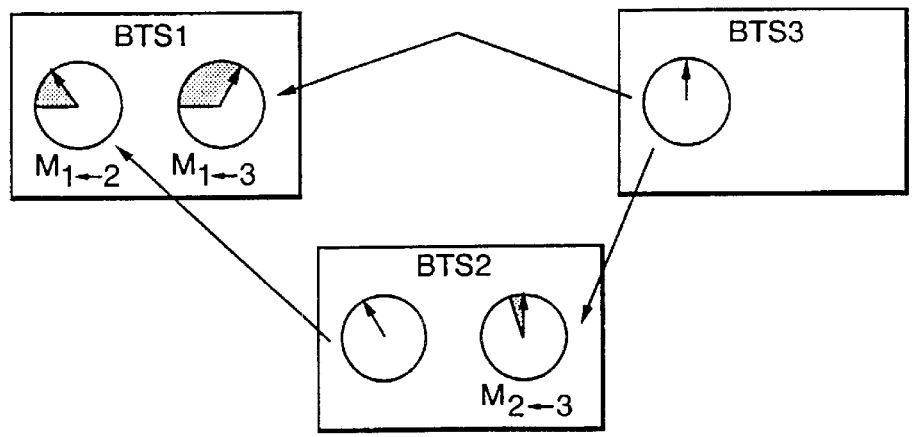
FIG. 4 illustrates the situation where there is no direct line of sight between first and third base stations and there is line of sight between first and second and between second and third base stations.

Fortunately, these errors can be reduced because there is redundancy in the matrix M. This redundancy is due to the fact that there are different "paths" along which base stations can "see" each other. For example, base station 1 might "see" base station 3 directly, but might also "see" base station 2, which in turn "sees" base station 3, as illustrated in FIG. 4.

If there is line of sight, then the time offsets simply add up, for example:

$$M_{1 \leftarrow 3} = M_{1 \leftarrow 2} + M_{2 \leftarrow 3}.$$

Since the loss of line of sight can only increase these time offsets (because as described above $\Delta T_{NLOS} > 0$), the time offset $M_{1 \leftarrow 2} + M_{2 \leftarrow 3}$ is a better estimate for the true clock offset between base station 1 and 3 if it is smaller than $M_{1 \leftarrow 3}$. This happens, for example, if there is line of sight between base station 1 and base station 2 and between base station 2 and 3, but no line of sight between base station 1 and 3 (see FIG. 4).

In general, the principle is to find the minima of different time offsets measured along different paths between two given base stations. For every triplet of base stations where base station 1 "sees" base station 2 and base station 2 "sees" base station 3, $M_{1 \leftarrow 3}$ is substituted by $M_{1 \leftarrow 2} + M_{2 \leftarrow 3}$ if either $M_{1 \leftarrow 3}$ is undefined or if $M_{1 \leftarrow 2} + M_{2 \leftarrow 3} < M_{1 \leftarrow 3}$. After all such triplets are processed in this way, the minimisation is repeated all over again until the whole matrix M converges (does not change any more with a pass of the minimisation process). The time offsets produced cannot be worse than the original ones.

Figure 5:
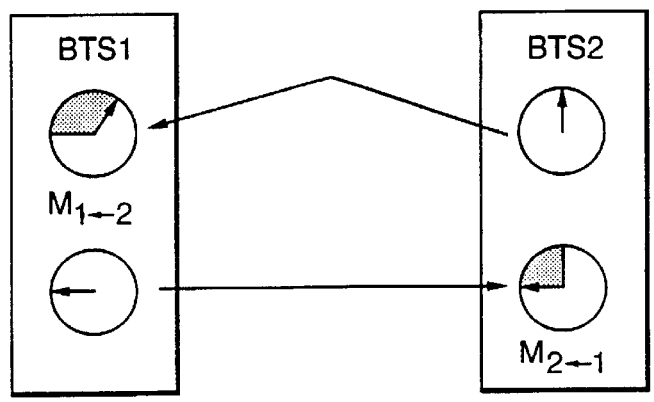
FIG. 5 illustrate the situation where there is a line of sight path from a first to a second base station but not from the second to the first base station.

Asymmetrical non line of sight errors are not dealt with in the aforementioned minimisation procedure. These could occur, for example, if base station 2 "sees" base station 1 with line of sight but the reverse is not true (see FIG. 5). The symmetry $M_{1 \leftarrow 2} = -M_{2 \leftarrow 1}$ holds for line of sight. Non-equality due to lack of line of sight can be averaged out. For every pair of base stations where $M_{1 \leftarrow 2}$ and $M_{2 \leftarrow 1}$ are both defined, the real clock phase $\Delta T_{BTS}$ for base station 2 relative to base station 1 is estimated as $(M_{1 \leftarrow 2} - M_{2 \leftarrow 1})/2$. This is an average with an absolute error of no more than $(M_{2 \leftarrow 1} + M_{1 \leftarrow 2})/2$ which can be used to assess the accuracy of the synchronisation process. If only one of the time offsets $M_{1\leftarrow 2}$ and $M_{2\leftarrow 1}$ is defined, is used as an estimate of the actual relative clock phase $\Delta T_{BTS}$.

Additional error estimates may be obtained by analysing the statistical properties of the observed relative clock phases as they are repeatedly reported over time.

The actual relative clock phases $\Delta T_{BTS}$ determined in this way can be expected to meet the proposed accuracy requirement of 5 µs, since the loss of accuracy due to the reduced non-line of sight error should normally be less than a factor of 5. In general, accuracy increases with the number of measured observed relative clock phases.

The algorithms specified above for reducing errors due to non-line of sight may be further be optimised for efficiency. For example, the computation time requirements of the given minimisation algorithm is of the order $N^3$, with N being the number of base stations operated by the base station controller, because data from two paths involving three base stations must be processed. The relationship between N and time depends on computer parameters. $N^3$ means that for example twice as many BSs would require 8×more computer power (i.e. $2^3=8$). An advantage of the method described above is that it is not time-critical and thus the base station controller can selectively synchronise base stations as required. A general preferred feature of the base station controller processing algorithm is that it makes all estimated relative clock phases "compatible", so that a determined relative clock phase ultimately does not depend on the "path" between the base stations along which it is determined.

In a synchronised network it becomes relatively easy to determine the location of a mobile station. For determining the location of a mobile station a new network element (referred to herein as an MLC (Mobile Location Centre)) could perform the actual calculation of a mobile station's location. At least for observed time difference based mobile station location both the base station controller and the mobile location centre MLC would preferably process the observed relative clock phases $\Delta T_{obs}$. In one embodiment the base station controller could receive these measurements from the GEMU and pass them on to the mobile location centre, and the base station controller and the mobile location centre could process them independently. In another option the GEMU could communicate only with the mobile location centre, and the mobile location centre could pass the calculated real time differences to the base station controller. In this case, all the processing described above happens in the mobile location centre and wireless GEMUs would be favoured.

Figure 6:
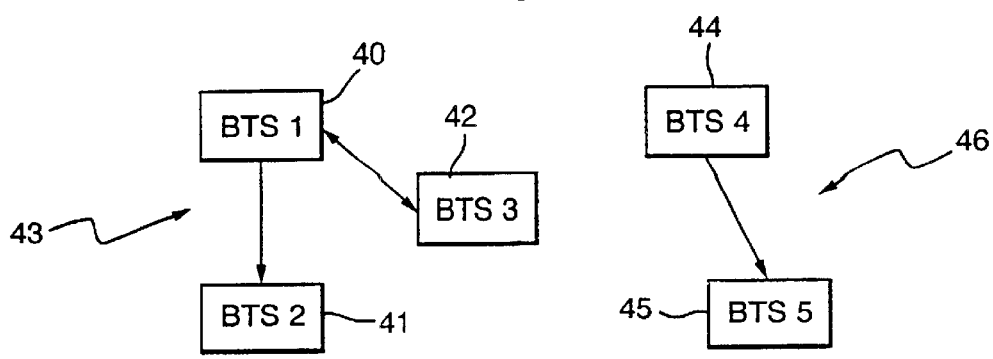
FIG. 6 illustrates two groups of base stations where the two groups are not synchronised.

As proposed above, time slot alignment is possible if there is at least one-way "visibility" for each base station. This situation might not apply for all base stations operated by a base station controller. In this case, the base stations could be synchronised to form groups of mutually synchronised base stations, none of the base stations in one group receiving or being received by any of the base stations in another group. This situation is illustrated in FIG. 6, where base stations 40, 41 and 42 form one group 43 and base stations 44 and 45 form another group 46. Each of the base station groups can be synchronised independently, which leads to synchronised sub-areas of the area controlled by a base station controller. The grouping can be determined from the processed matrix M. The base station controller may also decide to artificially create more synchronised sub-areas if it considers certain relative clock phases $\Delta T_{BTS}$ to be too inaccurate to be used for synchronisation.

Optionally, the system could also be used to check for faults in the system. For example, if the base station controller finds that a base station from which signals have previously been received by another base station suddenly is no longer received by the latter base station (or especially is no longer received by a number of other base stations) or if its timing wanders excessively then the base station controller could generate an alarm to indicate to the network operator that there is a potential fault.

After all the relative clock phases have been estimated, the base station controller must choose an (absolute) reference clock phase to which all base station clocks will be synchronised (for each synchronised sub-area). (Note that the following choices refer to the phase alignment of transmissions and not to the rate of the base station clocks). One possibility is for the base station controller's own clock to be chosen to provide a reference; in this case its phase should preferably be relatively stable. If the base station clock rates in a system are already derived from the base station controller clock rate over a standard interface, then this choice would have the benefit of requiring only relatively small phase corrections since the phase misalignment $\Delta T_{BTS}$ would primarily be caused by variable phase delays in the transmission equipment. Alternatively, one of the base stations may be selected as the reference. This would preferably be a high-power base station that is "visible" to many other base stations. This has the advantage that many of the determined relative clock phases will probably be quite accurate since $\Delta T_{BTS}$ would then depend in many cases mainly upon a single, commonly observed relative clock phase $\Delta T_{obs}$. Alternatively, the base station controller could calculate the average relative clock phase of all base stations. This reference would not correspond to any particular base station but would overall minimise the phase changes necessary to synchronise all clocks. This would only be useful if the base station clock phases were distributed non-uniformly and all base station clock rates were sufficiently accurate. (For equally distributed clock phases, an "average phase" would be arbitrary).

The base station controller then calculates a clock phase correction for each base station from the difference between the reference clock phase and the determined relative clock phase for the respective base station. In a system that is already partially synchronised each clock phase correction can suitably be represented by an integer number of steps of the desired synchronisation accuracy or less, in the range from zero to the maximum error in the existing synchronisation scheme. For instance, in GSM the correction could be a value between zero and one burst period ($\approx 577$ µs).

The base station controller sends the calculated clock phase corrections to each base station, preferably with a resolution of at least 1 µs. To avoid excessive messaging traffic and synchronising operations it preferably only sends a message if the base station exceeds or almost exceeds the permitted synchronisation bracket, i.e. only if the required correction exceeds a certain threshold e.g. 5 µs.

The base station then corrects its own clock in step S5 by delaying the clock phase by the received specified correction value to a resolution of at least 1 µs. Several hardware and software implementations are possible to achieve this:

1. A delay circuit could be located between the clock circuit and the main processor and this circuit could artificially delay the electrical signal comprising the clock signal, i.e. it shifts the rectangular clock pulse train in time. This could allow highly accurate (and preferably analogue) shifting of the timing.
2. A digital delay circuit could be located between the clock circuit and the main processor which suppresses some clock pulses. Where the base station clock runs at 26 MHz this method would yield a resolution of ~0.04 µs since this is the duration of a clock pulse.

3. A software delay functionality could be provided to modify internal time counters used for controlling the point in time when radio transmissions begin. This could also give sufficiently high resolution. This may be the easiest way to modify an existing base station to provide the necessary functionality.

The application of the delay must not violate the base station's timing requirements on the radio interface, therefore, the base station may spread a large phase correction over some time, e.g. is, and phase changes should preferably be made between two time slots. The largest corrections should normally occur shortly after the base station has started up, when they do not matter too much. After phase synchronisation has been established, corrections should rarely exceed 5 µs by much.

Optionally, the base station might modify the speed of its clock if the last few received clock phase corrections indicate a systematic deviation. This would improve the overall accuracy of synchronisation, and would in general allow for a much cheaper, less accurate base station clock to be implemented. However, the ability to "see" another base station would then be more important.

The full synchronisation of base station clocks is not necessarily needed in order for more efficient handovers to take place. With what may be termed pseudo-synchronised handovers, the network would tell the mobile station the relative clock phase between the current and the new base station, determined as described above. For handover purposes, this would provide generally the same benefits as truly phase-synchronised base station clocks. However, mobile station support for pseudo-synchronised handovers is only optional from GSM phase 2 onwards, whereas synchronised handovers are a standard GSM feature.

It is possible to synchronise base stations over a larger area than that under the influence of a single base station controller. Some base stations at a base station controller boundary will be able to receive signals from base stations operated by another base station controller, and thus base station controllers may gain knowledge of clock phase differences relative to synchronised areas controlled by other base station controllers.

In some circumstances synchronisation may become increasingly difficult the larger the synchronised area is. n addition to the increased signalling that is needed to achieve synchronisation over a larger area, the time taken to reach a synchronised steady state in a larger area would be expected to be larger. In addition, time slot alignment may itself become less advantageous as the size of the synchronised area increases. Therefore, it may be desired to restrict the size of synchronised areas to an optimum intermediate size. A natural candidate to approximate this size is a base station controller area. However, sometimes a contiguous geographical area may be covered by two (or more) interleaving base station controller domains, which reduces "visibility" between base stations under the same base station controller but increases mutual "visibility" of those interleaving base station controller domains. Furthermore, the capacity of a base station controller may be limited to (for instance to 256 or 512 transmitters). If the domain of the base station controller were synchronised, this number of transmitters could equate to fewer base stations than in current implementations because with synchronisation more transmitters could be deployed at each base station to take advantage of the increase in capacity that might be made possible by synchronisation. The potential advantages of tight reuse patterns and observed time difference based methods of mobile station location are emphasised if time slots are aligned within the whole network.

One way to achieve inter-base station controller synchronisation is to employ extra signalling between base station controllers to exchange observed, inter-base station controller, relative clock phases. This could be done, for example, by direct signalling between the base station controllers or, since base station controllers do not generally communicate directly, via another unit such as a mobile switching centre or a mobile location centre. In the latter case one possibility would then be for the mobile switching centre or a mobile location centre to command clock phase changes for all its base station controllers and/or the base stations and/or transmitters under its control. Clock phase corrections could be uniformly applied to all base stations under one base station controller. In the special case of interleaving base station controller domains, no inter-base station controller signalling may be needed. Each base station controller could iteratively change the clock phases of its base stations by half the observed relative clock phase to the other base station controllers base stations to achieve mutual synchronisation. Another solution is to establish a synchronisation hierarchy among base station controllers. Each base station controller could then synchronise all base stations in its base station controller domain with one particular adjacent base station controller domain, with one base station controller domain therefore being the synchronisation reference for the whole network. Another solution is for the calculation of both the actual relative clock phases and the clock phase corrections to be done not by the base station controller, but by a centralised network element, such as the mobile location centre (especially if a mobile station location function is implemented). The base station controller could then only be responsible for sending clock phase corrections to the base stations.

Some level of fault tolerance may be provided. If some error were to cause a base station to lose synchronisation with the rest of the network then quality of service need only degrade for a short period in time. Once the respective base station controller noticed the loss of synchronisation it could treat the faulty base station as non-synchronised until the problem is fixed. Loss of synchronisation would disturb the network only locally, it being unlikely that several base stations in the same area lose synchronisation at the same time. To reduce degradation in quality of service during the time needed to fix the fault, the base station controller might deactivate the traffic-only transmitters of the base station until synchronisation is regained, since the tight reuse factor of a synchronised GSM-type network would not apply to the BCCH transmitters.

The implementation of the system described above in a preexisting network may be done in phases. A first phase could use a wireless GEMU. Some of the aspects of the processing that might be implemented in software in a base station controller, such as the handling of non-line of sight effects and inter-base station controller synchronisation, could be omitted. In another implementation phase measurement hardware could be fully integrated with base stations (e.g. newly installed base stations) and/or more extensive software processing could be provided. To provide for synergy with mobile station location services software for determining real time differences could be implemented in a dedicated mobile location centre instead of at base station controllers.

It is clearly preferable that all base station clocks in a common synchronisation domain should running at the same rate, and preferably (in a GSM system) to the specified GSM accuracy.

Some potential advantages of certain implementations of the system described above will now be described with specific reference to GSM networks. However, it will be understood that some or all of the advantages are also applicable to other networks.

A synchronised network provides the potential for faster handovers, with performance generally the same as conventional intra-cell handovers. In a GSM implementation, for example, the time for handover signalling might be reduced from roughly 200 ms to around 100 ms.

In a conventional GSM system frames can be lost during handovers, causing audible clicks. This could be reduced by the implementation of synchronised handovers.

Mobile stations leaving low power coverage areas such as in buildings may enter a much a higher power environment. Faster handovers mean that there may be reduced interference from the mobile to the higher power environment and there is less risk that a call will be dropped.

Faster handovers mean that indoor pico cell handovers are possible as are handovers where the user is travelling in a lift between pico cells on different floors.

Faster handovers mean that less overlap is needed between cells to permit handovers of fast moving mobile stations, such as ones in trains.

In a conventional GSM network the current and the new base station both reserve capacity for the duration of the handover. The ability to make faster handovers means that the duration of this simultaneous reservation may be reduced and capacity thereby increased.

Synchronised handovers may need less signalling than unsynchronised handovers.

Synchronisation of base stations may make higher levels of frequency reuse possible. Theoretically, in a GSM system it might be expected that for high capacity cells traffic-only frequencies could move from a reuse factor of 6 to a reuse factor of 1, although in practice a reduction in reuse factor from 7–8 to 2–3 is perhaps more realistic. This advantage arises because by causing the base stations to transmit in phase, there may be significantly less interference. A higher level of frequency reuse should permit more capacity, since additional transmitters could operate without the need for more frequencies to be allocated. Furthermore, simpler reuse patterns would simplify network planning. Current frequency planning is often performed by allocating frequencies on a transmitter basis. In a synchronised network channels could be dynamically allocated on a per-slot basis, allowing 8 times the granularity in a GSM system. This would require knowledge of relative offsets of TDMA time slot numbers between base stations, but no synchronisation of frame numbers. A base station controller could apply frequency hopping as required. With frequency hopping, there would be expected to be little interference between two channels using the same set of frequencies and the same hopping sequence number but different mobile allocation indices. Synchronisation could thus potentially allow the same set of hopping frequencies to be used at adjacent base stations without interference if hopping sequences were synchronised. Full frame number synchronisation could enable synchronisation of hopping sequences.

Erlang tables are used to predict capacity according to the number of traffic channels per cell. With faster handovers traffic could be dynamically shifted to neighbouring cells to increase capacity by dynamically exploiting diversity between overlapping cells of the network.

Rural base stations may drop calls in the region of overlap between cells due to low signal strength. With synchronisation, the base station controller could be programmed to transmit the same information from the two base stations in question with the same frequency and the same time slot. The mobile station may therefore receive the same signal from two base stations and this will increase the effective strength of signals in the region of overlap.

In many instances IUO "Intelligent Underlay Overlay" is currently based on worst case assumptions of interference, and capacity is planned on a per-transmitter basis. Synchronisation could enable a base station controller or another network unit to establish during operation the time slot(s) in which interference actually occurs, making use of knowledge of relative offsets of TDMA time slot numbers between base stations. With this feature larger IUO cells could be used, permitting more efficient use of bandwidth, at least in some circumstances.

In a synchronised network, because each mobile station needs less time to make timing measurements more time is available for other functions. One possibility is for a mobile station to make extra measurements to instead improve traffic control and handover decisions. This could take advantage of a system that used randomly distributed frame numbers or even better a system in which frame number offsets were carefully planned to a scheme which to some extent optimised the time offsets between synchronisation bursts of adjacent base stations to the measurement schedule of mobile stations. This latter system will be described in more detail hereinafter.

The measurement units associated with base stations as described hereinbefore could be used to detect potential faults in the system and to report such potential faults to the network operator. Examples of such potential faults include detection of neighbouring base stations that cease to transmit (especially ones that are intended by their base station controller to be in operation) or ones whose synchronisation drifts or is excessively inaccurate. Furthermore, the measurement units could report on received signal level and accuracy from neighbouring base stations to give the network additional information on network interference and/or loss of coverage.

Since minor errors in base station timing can be corrected by the system described above, in such a system less accurate and hence less expensive base station clocks could be used.

A synchronised system as described above may make it easier to meet the FCC911 requirement for determining the locations of mobile stations. FCC911 is a US requirement that the location of a mobile station be known within a given accuracy for emergency purposes. Two locating methods are proposed: the TOA (time of arrival) method, which makes use of the times at which signals from mobile stations are received, and the OTD (observed time difference) method, which makes use of observed differences in the reception of signals for example from a mobile station at a plurality of base stations. These methods generally demands knowledge of the real-time differences (RTDs) between neighbouring base stations to a relatively high level of accuracy, which could be achieved relatively easily in a synchronised network.

In the preceding embodiment, time slot alignment is achieved. An alternative embodiment will now be described in which not only is time slot alignment used but also the TDMA frame numbers of base stations are also synchronised, preferably for small groups of base stations.

Since frame numbering is hierarchical, with the most important cycles being the basic TDMA cycle, the multi frame cycle, and the hyper frame cycle, there are several available levels of frame number synchronisation. However, fully synchronised frame numbers are not necessarily desirable, since this would imply simultaneous transmission of frequency and synchronisation bursts of all base stations, which would reduce the time available to mobile stations for pre-synchronising to and measuring reception levels of neighbouring base stations, and which in turn would lead to poorer handover performance. This will be discussed hereinafter in more detail. In general, different features made possible by time slot alignment require different levels of frame number synchronisation. Therefore, the optimal choice for frame number synchronisation depends on the relative importance of the feature in question.

To achieve frame number synchronisation a base station could send relative frame numbers, i.e. the differences between frame numbers of adjacent base stations and its own corresponding frame number to the base station controller. The base station controller's knowledge of relative frame numbers as in a GSM system should normally be sufficient for most aspects of timeslot alignment. If some level of frame number synchronisation is to be provided then it may be required that the base station controller be able to command base stations to change their frame counter. This could suitably happen when a base station starts up, e.g. before it starts transmitting on the BCCH.

Time frame synchronisation means changing each base station's independent and unique time frame numbering regimes by an integer multiple of burst periods. This method involves determining the differences in frame number between different base station frame number regimes over the air interface. The base station controller then commands each base station to adjust its frame number regimes over the air interface by a certain relative value. This is thus a differential technique which provides a solution independent of the variable and unknown transmission delays across the Base Station Systems BSS and radio propagation delay.

Figure 8:
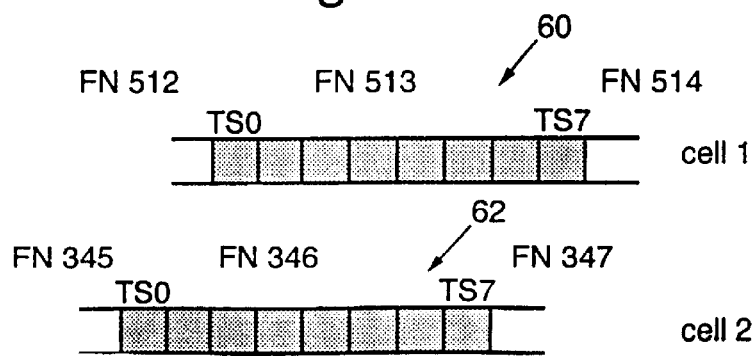
FIG. 8 illustrates a situation where the frame numbers of two base stations are not synchronised.

In current GSM systems the start of the transmission of TDMA frames, i.e. the beginning of the first time slot TS 0, by the base stations is not coordinated between the base stations. Each base station independently selects the frame number (FN) of the first frame it transmits at random. Time slot alignment as described hereinbefore does not change this. Accordingly the relative time slots and frame numbers between base stations remain arbitrary as illustrated in FIG. 8 which shows the slots and frames 60 transmitted by one base station and the slots and frames 62 transmitted by another base station. The time slots may be aligned but the frame numbers are not nor are the beginning of each of the frames.

The base station controller is not aware of the frame numbers and time slot for any base station at a certain time since the base station controller and base stations do not share a common time reference. This is because the Abis (interface between the base station and the base station controller) transmission network causes unknown and variable delays.

However, if the base station controller knows about the relative time slots and frame numbers for each base station, improvements can be achieved. The current GSM systems allocate frequencies on a transceiver basis. Channel allocation on a time slot basis provides 8 times the granularity and reduces interference. For example, if time slot number 3 of a base station 1 is concurrent in time with time slot number 5 of base station 2 which use the same frequency as time slot number 3 of base station 1, then the base station controller can avoid allocating time slot number 5 of base station number 2 if time slot number 3 of base station 1 is already allocated. This interference management feature requires the base station controller's knowledge of relative time slots (and relative frame numbers for SDCCHs (the Stand-alone Dedicated Control Channel)) between base stations.

IUO is currently based upon a worst case interference scenario and capacity is planned on a transceiver basis. The base station controller is able to work out in which time slot the interference actually occurs. This makes possible larger IUO cells and thus more efficient use of bandwidth. This again requires the base station controller's knowledge of relative time slots and frame numbers between base stations.

Figure 9:
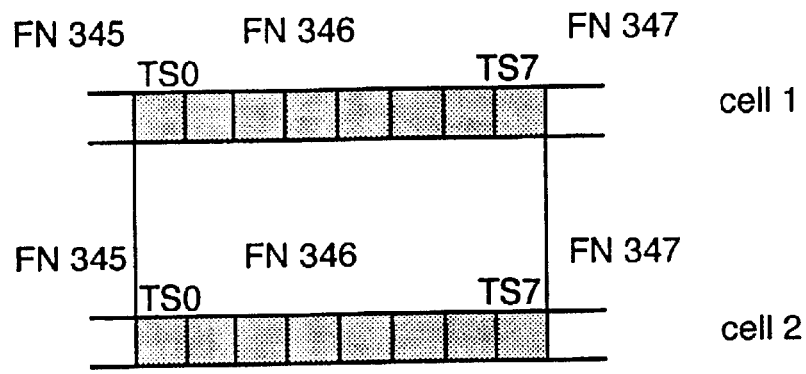
FIG. 9 illustrates a situation where the frame numbers of two base stations are synchronised.

To achieve a significant capacity improvement the mere knowledge of relative time slots and frame numbers may not be sufficient. Instead, it may require the synchronisation of TDMA frames and their frame numbers between base stations as illustrated in FIG. 9.

The advantage of frame number synchronisation is that tighter frequency reuse can be achieved. With frequency hopping, there is no interference between two channels using the same set of hopping frequencies and the same hopping sequence number HSN but different mobile allocation offsets MAIO. Co-channel interference within a cell is therefore avoided by using the same hopping sequence number but different mobile allocation index offsets for all hopping transceivers within a cell. The same hopping frequencies can be reused in adjacent cells using a different hopping sequence number, but at the cost of a statistical average for co-channel interference being proportional to 1/N where N is the number of hopping Frequencies. Thus the same hopping sequence number should be used for as many transceivers in a cell as possible.

Since for any hopping set with N frequencies, there is the same number N of different mobile allocation index offsets, co-channel interference is minimised if N transceivers use the same hopping sequence number. With usually less than N hopping transceivers in a cell the set of possible mobile allocation index offsets cannot be exhausted within a single cell and it is desirable to use the same hopping sequence number in more than one cell (also known as frequency sharing) to better match the number of hopping frequencies with the number of transceivers using the same hopping sequence number.

However, having the same hopping sequence number but different mobile allocation index offset is not sufficient to provide non colliding hopping sequences in different cells since each frequency of any hopping sequence depends also on the frame number of the corresponding TDMA frame. In particular, the non collision depends on the superframe number part of for the frame number which is the time parameter in modulo 64. Thus synchronisation of frame numbers is required for frequency sharing. Without frame number synchronisation between two cells, there will be interference between two channels of these two cells even if they are assigned the same hopping sequence number. The pseudo random nature of the frequency hopping sequences makes it difficult to accommodate different TDMA frame numbers by a specific choice of frequency hopping parameters to make frequency sharing useful without frame synchronisation.

With multi sectored sites this restriction is not a problem since all transceivers at one site are or easily fully synchronised and the frame numbers are all the same for all time slots concurrent in all cells. This increases the useful length N of hopping sequences as compared to single site base stations. For example for a three sector site with three hopping transceivers for each sector, a set of nine hopping frequencies is optimal since then each hopping transceiver can be allocated a different mobile allocation index offset and all nine possible mobile allocation index offsets are exhausted. In a non synchronised network with all base stations transmitting in their own time domain, co channel interference between adjacent cells occurs when the same frequency hopping sets are used. In contrast in a frame number synchronised network, all base stations will start their burst transmissions simultaneously. One advantage of frame number synchronisation is that the same frequency hopping set and the same hopping sequence number can be used in more than one cell without co channel interference. This means that tighter frequency reuse can be achieved with, for example traffic only frequencies.

In summary, with frequency hopping, there is no interference between two channels using the same set of frequencies and the same hopping sequence number but different mobile allocation indices. Therefore it is desirable to use the same hopping sequence in different base stations. But since hopping sequences are determined mainly by the frame number sequence, this is only possible if frame numbers are synchronised. For a frequency hopping network, the frequency hopping sequences may be determined by the frame number. Frame number synchronisation of many base stations may degrade handover performance which is caused by the way mobile stations detect adjacent cells. Accordingly, in preferred embodiments of the invention, frame number synchronisation is used only for small groups of base stations.

This embodiment of the invention can use the same components as described hereinbefore to provide time slot alignment. The relative misalignments of burst transmissions of different base stations are measured by the GEMU elements.

Time slot and frame number detection therefore makes use of and relies upon time slot alignment. In other words, the time slots are aligned before frame number detection takes place since the frame number detection only make sense when time slots are aligned. The detection of time slots and frame numbers is done over the air interface. The necessary radio measurements are done by the GEMU elements, required for time slot alignment, and reported to the base station controller. Since the features in question depend only on the base station controller's knowledge of the difference in time slot and frame number between the base stations and not on the absolute time slot and frame number values of any base station, no common absolute time reference between base stations or between base station controller and base stations is required it is sufficient if time slot and frame number detection takes place shortly after the base station has started up. The differences in time slot and frame number to any neighbour base station remain constant making frame number detection very robust.

The GEMU pre-synchronises to neighbouring base stations as part of the time slot alignment process. This includes receiving synchronising channel bursts which contain the frame number and are always sent in the first time slot, TS0. The GEMU also determines the time when it receives those Synchronising channel bursts within the time reference of its host or reference base station, i.e. the frame number, the time slot, and the time slot misalignment. For the purpose of time slot alignment, the GEMU reports the observed time slot misalignment values to the base station controller. Now, for the purpose of frame number synchronisation, the GEMU also reports the differences in time slot and frame numbers between the neighbouring base stations and the host base station.

The observed time differences between base stations change as the network tries to reduce the real time differences, i.e. the time difference between simultaneous transmissions, to zero. After a few iterations of this feedback process, however, the differences in time slot and frame number do not change anymore and subsequent changes concern only the time slot misalignment. The base station controller determines when this stable state is reached by verifying that time slot misalignment values are below a certain threshold.

The base station controller can now make use of the knowledge of relative time slots and relative frame numbers in order to implement network enhancement features such as those mentioned hereinbefore. The GEMU elements may also be used for mobile station location. Ongoing maintenance of time slot alignment means that time slot and frame number differences between the base stations remain constant. This holds even if a base station temporarily falls out of the time slot alignment process, since the later correction of a misalignment due to drift can always be performed in a way such that time slot and frame number differences are preserved. Hence, some GEMU reporting capacity may be saved by transmitting time slot and frame number differences less frequently than time slot misalignments.

Frame number synchronisation is possible for base stations which are time slot aligned and for which time slot and frame number detection is available, but is preferably applied only to small groups of base stations since large-scale frame number synchronisation may not be desirable. Frame number synchronisation is done shortly after the base station has started up. No periodic feedback process is necessary to maintain frame number synchronisation. Random relative frame numbers are preserved between frame number synchronised groups.

The base station controller knows from the radio network plan about groups of those base stations which should have their frame numbers synchronised with each other. The base station controller makes sure that all base stations in each such group do not become immediately accessible for mobile stations after start-up. These base stations may choose a random frame number at start-up as usual and must start to transmit on common channels on the BCCH frequency, but the cell must be marked as 'barred'. For the first base station of each synchronisation group which enters this state, the base station controller can immediately remove the 'cell-barred' status. This base station will serve as a "master" (that is the host or reference) to the other "slave" base stations of the same group. For each slave base station, the base station controller waits until its transmissions are "roughly" time slot aligned with the corresponding master base station. It is not necessary to wait until "precise" alignment, i.e. with the specified accuracy of 5 $\mu$s, since the relative time slots and frame numbers will not change after the first few iterations of the time slot alignment process.

Optionally, the base station controller might speed up time slot alignment by treating this slave base station with higher priority in the ongoing time slot alignment process. The base station controller calculates the difference in time slot and frame number between the slave and master base station. The base station controller sends a command to the base station to changes its time slot and its frame number by the calculated differences, such that the differences in time slot and frame number will be reduced to zero. The slave base station changes its radio transmissions accordingly and instantly by changing appropriate time counters in its software. The base station controller clears the 'cell-barred' condition. The slave base station is now fully operational and frame number synchronised with its master. Possibly remaining small discrepancies in time slot alignment will be removed by the time slot alignment process without losing the frame number synchronisation. Frame number synchronisation could also be done when the base station is already in use, although there seems to be no need to do so. The base station controller would first have to hand over all current traffic to other base stations and then bar the cell as is also required for base station maintenance which might require shutting down a base station.

An alternative method of synchronizing the frame number involves transmitting an absolute frame number value across variable transmission delay elements with an accuracy to at least half a burst period (289 $\mu$s). Furthermore, the method requires that the base station controller is able to interrogate each base station for its frame number and obtain it with an accuracy of half a burst period. Guaranteeing such high time resolution between network elements requires appropriate signalling.

In a network incorporating base station time slot alignment, new methods to reduce interference may be implemented and thus enable an increase in capacity. But in order to implement these techniques, the base station controller must manage the time slot separation and frame number separation of simultaneous transmissions of different base stations.

If the frame numbers are aligned over an area covered by a large number of cells, the mobile stations may require longer to pre-synchronise to adjacent cells and the maintaining of the pre-synchronising may be harder. Pre-synchronisation speeds up handovers and helps to identify the cells which dominate the frequencies on which the mobile stations measure the received field strengths. These field strength measurements are used to make handover decisions and for auto base station system features. Full frame synchronisation may be disadvantageous.

The mobile station has to receive and analyse the frequency correction and synchronisation channel bursts transmitted by each base station in a dedicated mode for pre-synchronising to adjacent cells. Subsequent maintenance of this pre-synchronisation requires that the mobile station continue to receive the synchronisation channel bursts. These steps can only take place in the search frame which occurs every 26 TDMA frames in GSM, that is every 120 ms, due to the stringent timing constraints which a mobile station has to follow in the GSM standard.

In a fully frame number synchronised network, each frequency correction and synchronisation channel burst is transmitted by all base stations simultaneously which has a detrimental effect on the probability that the mobile station will locate these bursts in the search frame. As a result of the timing scheme of the synchronisation channel bursts the mobile station may only be able to receive the synchronising channel burst every 9.4 search frames which is about once a second. Without frame synchronisation, synchronising channel bursts of different base stations can be assumed to be equally distributed over time and the mobile station can use all of its of its search frames for the reception of synchronising channel bursts which may give a receive capacity of one synchronising channel burst every 120 ms. This means that the synchronisation of frame numbers can lead to a reduction in the capacity for receiving the synchronising channel bursts of a factor of about 9.4. For the mobile stations which are able to process more than one synchronising channel burst per search frame, the degradation in relative capacity may be higher.

With initial pre-synchronisation, the situation is more complicated since the mobile station does not know in advance in which search frame it will be able to receive a frequency correction channel burst on a given BCCH frequency. The mobile station therefore has to start its search at a random point of time and on average the mobile station will for five search frames before it is able to receive a given frequency correction channel burst on a given BCCH frequency for the first time. This is regardless of whether there is any frame number synchronisation. Two frames later it can receive the synchronising channel burst to complete pre-synchronisation. However after handover, the list of adjacent base stations usually has more than one change so the mobile station will sometimes initiate a second pre-synchronisation process immediately after the one that has just been completed. If there is no frame synchronisation, it will take around five search frames on average to receive the frequency correction channel burst and with frame synchronisation it takes on average 7.4 search frames to receive the frequency correction channel burst.

This means that frame number synchronisation reduces performance by 50 percent. In practice, mobile stations will not receive every frequency correction and synchronisation channel burst due to bad reception conditions. With frame number synchronisation, the mobile station will take 9.4 search frames until it is next able to receive the missed burst and no use can be made of the intervening search frames. Without frame number synchronisation, those intermediate search frames can be used by the mobile station to listen to other mobile stations.

In summary, preferred embodiments of the invention do not have frame number synchronisation over an entire network as discussed hereinbefore. The number of base stations which are frame number synchronised to one another will depend on the network requirements as well of course the access method used. However some embodiments of the present invention may by synchronised over the entire network.

Figure 10:
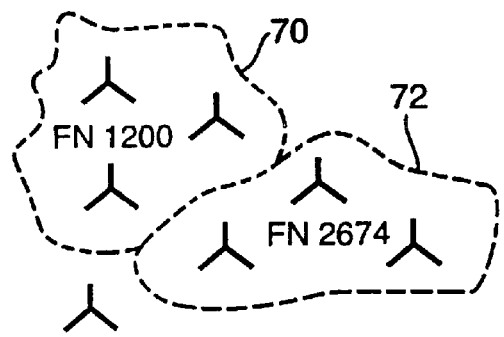
FIG. 10 illustrates a first partial synchronisation system.

An alternative to the frame synchronisation described hereinbefore will now be described. In particular, two types of partial frame number synchronisation will now be described. A first form of partial frame number synchronisation will be described with reference to FIG. 10. In this embodiment, frame numbers are synchronised within a small group of base stations. This group is much smaller than in the method discussed hereinbefore. Typically, each group will have two or three base stations. FIG. 10 shows two of these small groups 70 and 72. The network would be made up of these small groups. As only two or three base stations are synchronised in each group, advantages can be achieved particularly in frequency hopping environments. With three frequency hopping transceivers at three sectored cell sites, eighteen hopping frequencies can be effectively shared among two base stations. With those groups which have three coverage areas served by one base station, more than two base stations can be included in each group but this might lead to problems. If each base station serves only one coverage area, then each group may consist of three or four base stations.

Figure 11:
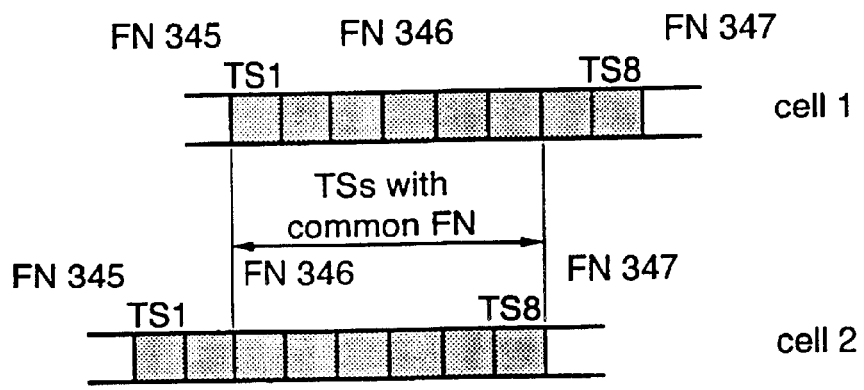
FIG. 11 illustrates a second partial synchronisation method.

A second alternative to the frame number synchronisation is shown in FIG. 11. In this alternative, the frames with the same frame number are not fully synchronised. Rather, there is partial synchronisation of the frames. In other words, the frames with the same frame number are desynchronized by a few time slots. This means that the Frequency correction channel and the synchronising channel bursts of the adjacent base stations do not coincide. In this way the number of time slots where the frame number is synchronised in neighbouring cells is reduced. For example, two neighbouring sites whose frames are out of synchronisation by two time slots will share the same frame number in six out of eight time slots. Frequency sharing is most useful on the six shared time slots and this will be taken into account when allocating channels.

Although the frequency correction channel and synchronising channel bursts of neighbouring cells do not collide in this alternative, there is a high probability that these bursts will fall within the same search frame of a mobile station. Therefore only those mobile stations which after having found a frequency correction channel burst in a certain search frame start to search for a frequency correction channel burst of another neighbouring base station in the same search frame will not have frame synchronisation.

This method is particularly applicable to one dimensional chains of cells, such as two sectored directional cell sites arranged, for example, along a street.

Frame number synchronisation may permit a tighter frequency reuse pattern which could increase capacity.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

What is claimed is:

1. A telecommunications system comprising:
   a first transmitter unit for transmitting first signals to at least one station;
   a second transmitter unit for transmitting second signals to at least one station;
   a first receiving unit associated with the first transmitter unit for receiving the second signals;
   a second receiving unit associated with the second transmitter for receiving said first signals; and
   a synchronization unit coupled to both the first and second receiving units;
   said synchronization unit being arranged to compare the timing of the first signals with the timing of the second signals as received by the respective receiving units and to generate a control signal to at least one of the first and second transmitters to increase the synchronization of the first and second signals.

2. A telecommunications system as claimed in claim 1, wherein at least one of the first and second receiving units is arranged to determine a difference between timing of the first transmitter unit and the second transmitter unit.

3. A telecommunications system as claimed in claims 2, wherein at least one of the first and second receiving units is arranged to calculate an average difference between the timing of the first transmitter unit and the second transmitter unit.

4. A telecommunications system as claimed in claim 2, wherein at least one of the first and second receiving units is arranged to transmit the difference to said synchronization unit.

5. A telecommunication system as claimed in claim 2, wherein said synchronizing unit is arranged to adjust difference in timing determined by each of said receiving units to take into account the relative positions of said transmitter units.

6. A telecommunications system as claimed in claim 1 wherein the first and second transmitter units are arranged to be synchronized to within 5 µs.

7. A telecommunications system as claimed in claim 1 wherein said synchronization unit is arranged to synchronize said first and second transmitters to a reference clock.

8. A telecommunications system as claimed in claim 7, wherein said reference clock is supplied by said synchronization unit.

9. A telecommunications system as claimed in claim 7, wherein said reference clock is a clock signal of one of said first and second transmitter units.

10. A telecommunications system as claimed in claim 7, wherein said reference clock is the average of clock signals of said first and second transmitter units.

11. A telecommunications system as claimed in claim 1, wherein the synchronization unit is arranged to generate said control signal if the timing of said first and second transmitters differ by at least a predetermined amount.

12. A telecommunication system as claimed in claim 1, wherein the synchronization unit is arranged to average a difference in the timing of the first and second transmitter units provided by the receiving units associated with the first and second transmitter units respectively.

13. A telecommunications system as claimed in claim 1, wherein said system comprises a third transmitter unit and a further receiving unit associated therewith, wherein each of the three receiving units determines the difference of the timing signals between the transmitter unit with which the receiving unit is associated and each of the other two transmitter units.

14. A telecommunications system as claimed in claim 13, wherein said synchronization unit is arranged to determine the minimum timing difference between two transmitter units based on a comparison of the timing difference observed by the receiving unit associated with one of the two transmitter units between said transmitter units and the sum of: the difference observed by the receiver unit associated with said one transmitter unit between said one transmitter unit and the third transmitter unit; and the difference observed by the receiver unit associated with the third transmitter unit between the third transmitter unit and the other of the two transmitter units.

15. A telecommunications system as claimed in claim 1, wherein at least one of the first and second receiving units is incorporated in the transmitter unit with which the respective receiving unit is associated.

16. A telecommunications system as claimed in claim 1 wherein the first and second transmitter units use a time division multiple access method where time is divided into a plurality of slots and said first and second transmitter units transmit signals to different stations in different time slots, said synchronization unit being arranged to synchronize substantially the beginning of time slots of the first and second transmitter units.

17. A telecommunications system as claimed in clam 16, wherein the frequency of the first and said second transmitter units changes between time slots.

18. A telecommunications system as claimed in claim 16, wherein n time slots are arranged in a frame and each frame has an associated number.

19. A telecommunications system as claimed in claim 18, wherein frames having the same frame numbers of said first and second signals are synchronized.

20. A telecommunications system as claimed in claim 18, wherein the frames having the same frame numbers of said first and second signals overlap in time but the beginning of said frames do not coincide.

21. A telecommunications system as claimed in claim 1, comprising a multiplicity of transmitter units, said multiplicity of transmitter units being divided into a plurality of groups, each group comprising a plurality of transmitter units which are substantially synchronized with the other of the transmitter units in said group and the plurality of groups are not synchronized with respect to each other.

22. A telecommunication system as claimed in claim 21, wherein each group comprises three or four transmitter units, each transmitter unit serving a single coverage area.

23. A telecommunications system as claimed in claim 21, wherein each group comprises two transmitter units, each transmitter unit serving a plurality of coverage areas.

24. A telecommunications system as claimed in claim 1, wherein said system is a wireless cellular telecommunications network.

25. A telecommunications network as claimed in claim 24, wherein the wireless cellular network is in accordance with the GSM standard.

26. A telecommunications system as claimed in claim 24, wherein at least one of said transmitter units is a base transceiver station.

27. A telecommunication network as claimed in claim 24 wherein the synchronization unit is incorporated in a base station.

28. A telecommunication network as claimed in claim 1, wherein said synchronization unit is arranged to build a matrix wherein each element of said matrix represents the timing difference between two transmitter units.

29. A method for synchronizing a telecommunications system comprising:
  transmitting first signals to at least one mobile station from a first transmitter unit;
  transmitting second signals to at least one mobile station from a second transmitter unit;
  receiving the second signals at said first transmitter unit;
  receiving the first signals at said second transmitter unit; and
  comparing at a synchronization unit coupled to both the first and second receiving units, the timing of the first signals with the timing of the second signals as received at the first and second transmitter units and generating a control signal to at least one of the first and second transmitter units to increase the synchronization of the first and second signals.

30. A telecommunications system comprising:
  a first transmitter unit for transmitting first signals to at least one station where said at least one station is in a first area covered by said first transmitter unit;
  a second transmitter unit for transmitting second signals to at least one station when said at least one station is in a second area covered by said second transmitter unit; and
  a timing difference determining unit for determining the difference in timing of said first and second transmitter units and for providing information on said difference to at least one station, said information being used by said station when said station moves between said first and second areas, said timing difference unit being separate from said first and second transmitter units.

31. A station for use in a telecommunications network comprising:
  a first transmitter unit for transmitting first signals to at least one terminal; and
  a receiving unit for receiving second signals from a second transmitter unit which is arranged to transmit second signals to at least one terminal, said receiving unit arranged to determine a difference in the timing between said first and second transmitter units, wherein the station is arranged to send the difference in the timing to a separate timing control unit and to receive from the separate timing control unit a control signal for reducing the difference in timing between said first and second transmitter units.

32. A telecommunications system comprising:
  a first transmitter unit for transmitting first signals to at least one station;
  a second transmitter unit for transmitting second signals to at least one station;
  a receiving unit for comparing the time of said first and second signals; and
  a synchronization unit coupled to the receiving unit for generating a control signal to at least one of the first and second transmitters to increase the synchronization of the first and second signals, said synchronization unit being separate from said receiver unit.

33. A telecommunications system comprising:
  a first transmitter unit for transmitting first signals to at least one station;
  a second transmitter unit for transmitting second signals to at least one station;
  a first receiving unit associated with the first transmitter unit for receiving the second signals;
  a second receiving unit associated with the second transmitter unit for receiving said first signals;
  a third transmitter unit;
  a third receiving unit associated with the third transmitter unit; and
  a synchronization unit coupled to the first, second and third receiving units for generating a control signal to at least one of the first, second and third transmitters to increase the synchronization of the first and second signals,
  wherein each of the first, second and third receiving units determines a difference of the timing signals between the transmitter unit with which the receiving unit is associated and each of the other two transmitter units, and wherein said synchronization unit is arranged to determine a minimum timing difference between two transmitter units based on a comparison of the timing difference observed by the receiver unit associated with one of the two transmitter units between said transmitter units and the sum of: (i) the difference observed by the receiver unit associated with said one transmitter unit between said one transmitter unit and the third transmitter unit; and (ii) the difference observed by the receiver unit associated with the third transmitter unit between the third transmitter unit and the other of the two transmitter units.

34. A telecommunication system comprising:
  a multiplicity of transmitter units divided into a plurality of groups, each group comprising a plurality of transmitter units which are substantially synchronized with one another and the plurality of groups are not synchronized with respect to each other, wherein at least one group comprises;
  a first transmitter unit for transmitting first signals to at least one station;
  a second transmitter unit for transmitting second signals to at least one station;
  a receiving unit associated with the first transmitter unit for receiving the second signals;
  a synchronization unit coupled to the receiving unit for generating a control signal to at least one of the first and second transmitters to increase the synchronization of the first and second signals.

35. A telecommunications system as claimed in claim 34, wherein each group comprises three or four transmitter units, each transmitter unit serving a single coverage area.

36. A telecommunications system as claimed in claim 34, wherein each group comprises two transmitter units, each transmitter unit serving a plurality of coverage areas.

* * * * *